US011851548B2

(12) United States Patent
Yamamoto et al.

(10) Patent No.: US 11,851,548 B2
(45) Date of Patent: Dec. 26, 2023

(54) LATEX COMPOSITION

(71) Applicant: ZEON CORPORATION, Tokyo (JP)

(72) Inventors: Misa Yamamoto, Tokyo (JP); Masaru Kitagawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 777 days.

(21) Appl. No.: 16/491,805

(22) PCT Filed: Feb. 14, 2018

(86) PCT No.: PCT/JP2018/005113
§ 371 (c)(1),
(2) Date: Sep. 6, 2019

(87) PCT Pub. No.: WO2018/163734
PCT Pub. Date: Sep. 13, 2018

(65) Prior Publication Data
US 2020/0157314 A1   May 21, 2020

(30) Foreign Application Priority Data

Mar. 8, 2017 (JP) ................................ 2017-043545
Mar. 8, 2017 (JP) ................................ 2017-043548

(51) Int. Cl.
| C08K 5/053 | (2006.01) |
| C08L 13/02 | (2006.01) |
| C08F 236/06 | (2006.01) |
| C08K 5/435 | (2006.01) |
| B29C 35/08 | (2006.01) |
| B29C 41/14 | (2006.01) |
| C08J 5/02 | (2006.01) |
| C08K 5/134 | (2006.01) |
| B29K 7/00 | (2006.01) |
| B29L 31/48 | (2006.01) |

(52) U.S. Cl.
CPC .......... C08K 5/435 (2013.01); B29C 35/0805 (2013.01); B29C 41/14 (2013.01); C08J 5/02 (2013.01); C08K 5/1345 (2013.01); B29C 2035/085 (2013.01); B29K 2007/00 (2013.01); B29L 2031/4864 (2013.01); C08J 2309/02 (2013.01)

(58) Field of Classification Search
CPC .......... B29C 2007/00; B29L 2031/4864; C08J 2309/02; C08K 5/435; C08K 5/063; C08K 5/0016; C08L 13/02; C08F 236/06; C09J 113/02
See application file for complete search history.

(56) References Cited

U.S. PATENT DOCUMENTS

| 4,102,844 A * | 7/1978 | Schwinum ............ C08F 236/04 264/306 |
| 6,031,042 A * | 2/2000 | Lipinski .................. C08L 13/02 524/556 |
| 2008/0207809 A1* | 8/2008 | Koide ....................... C08K 3/22 524/394 |
| 2010/0104789 A1* | 4/2010 | Imada ..................... B32B 25/14 428/36.8 |
| 2013/0310519 A1* | 11/2013 | Tanaka .................... C08B 15/05 536/84 |
| 2014/0100315 A1* | 4/2014 | Tsukada .................. B32B 25/08 524/548 |
| 2017/0101498 A1* | 4/2017 | Tsukada .................. C08L 35/04 |
| 2017/0253729 A1* | 9/2017 | Nakashima ............. C08L 15/00 |

FOREIGN PATENT DOCUMENTS

| JP | S61-268742 A | 11/1986 |
| JP | H03-081390 A | 4/1991 |
| JP | 2003-165814 A | 6/2003 |
| JP | 2006-241219 A | 9/2006 |
| JP | 2017-222804 A | 12/2017 |
| WO | WO-2016031848 A1 * | 3/2016 |

OTHER PUBLICATIONS

Jan. 3, 2022 Office Action issued in European Patent Application No. 18 764 028.9.
Sep. 10, 2019 International Preliminary Report on Patentability issued in International Patent Application No. PCT/JP2018/005113.
May 1, 2018 International Search Report issued in International Patent Application No. PCT/JP2018/005113.
Aug. 31, 2021 Office Action issued in Indonesian Patent Application No. P00201907866.
Nov. 4, 2020 Search Report issued in European Patent Application No. 18764028.9.
Polymerdatabase: "Prediction of Solubility Parameters A Comparison of four Group Contribution Methods", Jun. 1, 2015 (Jun. 1, 2015), XP055687364, Retrieved from the Internet: URL: http://polymerdatabase.com/pdf/crow_solpar_June2015.pdf.

* cited by examiner

Primary Examiner — Karuna P Reddy
(74) Attorney, Agent, or Firm — Oliff PLC

(57) ABSTRACT

A latex composition has a latex of a carboxyl group-containing conjugated diene rubber (A), and a plasticizer (B) having a SP value of 15 $(cal/cm^3)^{1/2}$ or less, wherein the content of a plasticizer (B) is 0.1 to 15 parts by weight based on 100 parts by weight of the carboxyl group-containing conjugated diene rubber (A) included in the latex.

18 Claims, No Drawings

LATEX COMPOSITION

TECHNICAL FIELD

The present invention relates to a latex composition, and more particularly to a latex composition that enables the provision of a film-shaped molded article such as a dip-molded article having high tensile strength, large elongation, a supple texture, and high stress retention, and also having excellent durability, a film-shaped molded article and a substrate having an adhesive layer formed thereon obtained by using the latex composition, and a method for producing a dip-molded article by using the latex composition.

BACKGROUND ART

Conventionally, a latex composition containing natural rubber latex represented by natural rubber latex is used in the formation of film-shaped molded articles. As film-shaped molded articles, a dip-molded article, such as a nipple, a balloon, a glove, a medical balloon, a sack or the like used in contact with a human body is known. However, since a natural rubber latex contains a protein that causes allergic symptoms in the human body, there have been problems with film-shaped molded articles such as dip-molded articles, in particular gloves, that cane into direct contact with a living mucous membrane or an organ in many cases. Therefore, the use of synthetic rubber latex has been studied.

For example, Patent Document 1 discloses a latex obtained by copolymerizing 100 parts by weight of a monomer mixture comprising 65 to 84.5 parts by weight of a conjugated diene monomer, 15 to 25 parts by weight of an ethylenically unsaturated nitrile monomer, and 0.5 to 10 parts by weight of an ethylenically unsaturated acid monomer, and 0 to 19.5 parts by weight of another ethylenically unsaturated monomer copolymerizable therewith, and a dip-molded article obtained by dip-molding a latex composition obtained by blending sulfur with such a latex. According to the dip-molded article described in Patent Document 1, the texture is excellent and sufficient tensile strength can be obtained, but elongation and durability are not necessarily sufficient. In particular, regarding such a dip-molded article, in the case of a glove, the glove also needs to have excellent elongation and durability in addition to having excellent texture and sufficient tensile strength, from the perspective of achieving good elongation, and, preventing a glove from being broken.

RELATED ART

Patent Documents

Patent Document 1: Japanese Unexamined Patent Publication No. 2003-165814

SUMMARY OF THE INVENTION

Problem to be Solved by the Invention

It is an object of the present invention to provide a latex composition that enables the provision of a film-shaped molded article such as a dip-molded article having high tensile strength, large elongation, a supple texture, and high stress retention, and also having excellent durability, a film-shaped molded article and a substrate having an adhesive layer formed thereon obtained by using the latex composition, and a method for producing a dip-molded article by using the latex composition.

Means for Solving the Problem

As a result of extensive studies to solve the above-mentioned problems, the present inventors found that by controlling the content of the plasticizer in a latex composition containing a latex of a carboxyl group-containing conjugated diene rubber, and a specific plasticizer to be within a predetermined range, a latex composition can be obtained that enables the provision of a film-shaped molded article such as a dip-molded article having high tensile strength, large elongation, a supple texture, and high stress retention, and also having excellent durability, thereby completing the present invention.

Specifically, according to the present invention, there is provided a latex composition comprising a latex of a carboxyl group-containing conjugated diene rubber (A), and a plasticizer (B) having a SP value of 15 $(cal/cm^3)^{1/2}$ or less, wherein the content of the plasticizer (B) is 0.1 to 15 parts by weight based on 100 parts by weight of the carboxyl group-containing conjugated diene rubber (A) included in the latex.

In the latex composition of the present invention, the carboxyl group-containing conjugated diene rubber (A) is preferably at least one selected from the group consisting of a carboxyl group-containing nitrile rubber (a1), a carboxyl group-containing styrene-butadiene rubber (a2), and a carboxyl group-containing conjugated diene rubber (a3).

The latex composition of the present invention preferably further comprises a metal compound (C) including a divalent or higher metal.

In the latex composition of the present invention, the metal compound (C) including a divalent or higher metal preferably includes a metal compound including a trivalent or higher metal.

The latex composition of the present invention preferably further comprises at least one alcoholic hydroxyl group-containing compound (E) selected from the group consisting of a saccharide (e1), a sugar alcohol (e2), a hydroxy acid (e3), and a hydroxyl acid salt (e4).

The latex composition of the present invention preferably further comprises sulfur and/or a sulfur-containing compound (D) as a cross-linking agent in an amount of more than 0 parts by weight and 4 parts by weight or less in terms of the total of the sulfur and the sulfur-containing compound, based on 100 parts by weight of the carboxyl group-containing conjugated diene rubber (A) included in the latex.

In the latex composition of the present invention, the plasticizer (B) is preferably at least one selected from the group consisting of a sulfonamide compound and an alkyl cinnamate.

According to the present invention, there is provided a film-shaped molded article comprising the above latex composition.

According to the present invention, there is provided a substrate having an adhesive layer, comprising a substrate and an adhesive layer comprising the above latex composition formed on a surface of the substrate.

In addition, according to the present invention, there is provided a method for producing a dip-molded article, comprising: a step of forming a dip-molded layer by dip-molding the above latex composition; and a step of irradiating the dip-molded layer with radiation.

In the production method of the present invention, the radiation used for irradiation in the step of irradiating with radiation is preferably γ-rays.

In the production method of the present invention, the dip-molded article is preferably a glove.

Effects of Invention

According to the present invention, there can be provided a latex composition that enables the provision of a film-shaped molded article such as a dip-molded article having high tensile strength, large elongation, a supple texture, and high stress retention, and also having excellent durability, a film-shaped molded article and a substrate having an adhesive layer formed thereon obtained by using the latex composition, and a method for producing a dip-molded article by using the latex composition.

DESCRIPTION OF EMBODIMENTS

The latex composition of the present invention contains a latex of a carboxyl group-containing conjugated diene rubber (A), and a plasticizer (B) having a SP value of 15 $(cal/cm^3)^{1/2}$ or less. The SP value of the plasticizer (B) in the present invention is defined by a value estimated by using a simulation software, ASPEN PLUS (as the estimation method of this value, a method described in Examples (described later) can be used).

Latex Composition

The latex of the carboxyl group-containing conjugated diene rubber (A) included in the latex composition may be any latex of a copolymer obtained by copolymerizing a conjugated diene monomer and an ethylenically unsaturated carboxylic acid monomer. However, preferably, a latex of the carboxyl group-containing conjugated diene rubber (A) is a latex of at least one selected from the group consisting of a carboxyl group-containing nitrile rubber (a1), a carboxyl group-containing styrene-butadiene rubber (a2), and a carboxyl group-containing conjugated diene rubber (a3).

The latex of the carboxyl group-containing nitrile rubber (a1) is a latex of a copolymer obtained by copolymerizing, in addition to a conjugated diene monomer and an ethylenically unsaturated carboxylic acid monomer, an ethylenically unsaturated nitrile monomer. In addition to these, this latex may be a latex of a copolymer obtained by copolymerizing with another ethylenically unsaturated monomer optionally used and copolymerizable therewith.

Examples of the conjugated diene monomer include 1,3-butadiene, 2,3-dimethyl-1,3-butadiene, 2-ethyl-1,3-butadiene, 1,3-pentadiene, chloroprene, and the like. Of these, 1,3-butadiene is preferable. These conjugated diene monomers can be used singly or in combinations. The content of the conjugated diene monomer unit formed by the conjugated diene monomer in the carboxyl group-containing nitrile rubber (a1) is preferably 56 to 78% by weight, more preferably 56 to 73% by weight, and even more preferably 56 to 68% by weight. By setting the content of the conjugated diene monomer unit within the above range, a film-shaped molded article such as a dip-molded article formed by the obtained latex composition has a better texture and longer elongation while also having sufficient tensile strength. Although isoprene is also conceivable as an example of the conjugated diene monomer, monomer units derived from isoprene may cause softening and degradation upon subjected to irradiation with radiation. Therefore, when performing irradiation with radiation, a rubber that is substantially free from an isoprene-derived monomer unit is preferably used as a carboxyl group-containing nitrile rubber (a1).

The ethylenically unsaturated carboxylic acid monomer is not particularly limited as long as it is an ethylenically unsaturated monomer containing a carboxyl group. Examples thereof may include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; and ethylenically unsaturated polycarboxylic acid partial ester monomers such as monobutyl fumarate, monobutyl malate, and mono-2-hydroxypropyl maleate. Of these, ethylenically unsaturated monocarboxylic acids are preferable, and methacrylic acid is particularly preferable. These ethylenically unsaturated carboxylic acid monomers can also be used in the form of an alkali metal salt or an ammonium salt. Further, the ethylenically unsaturated carboxylic acid monomer can be used singly or in combinations. The content of the ethylenically unsaturated carboxylic acid monomer unit formed by the ethylenically unsaturated carboxylic acid monomer in the carboxyl group-containing nitrile rubber (a1) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the ethylenically unsaturated carboxylic acid monomer unit within the above range, a film-shaped molded article such as a dip-molded article formed by the obtained latex composition has a better texture and longer elongation while also having sufficient tensile strength.

The ethylenically unsaturated nitrile monomer is not particularly limited as long as it is an ethylenically unsaturated monomer containing a nitrile group. Examples thereof may include acrylonitrile, methacrylonitrile, fumaronitrile, α-chloroacrylonitrile, α-cyanoethyl acrylonitrile, and the like. Of those, acrylonitrile and methacrylonitrile are preferable, and acrylonitrile is more preferable. These ethylenically unsaturated nitrile monomers can be used singly or in combinations. The content of the ethylenically unsaturated nitrile monomer unit formed by the ethylenically unsaturated nitrile monomer in the carboxyl group-containing nitrile rubber (a1) is preferably 20 to 40% by weight, more preferably 25 to 40% by weight, and even more preferably 30 to 40% by weight. By setting the content of the ethylenically unsaturated nitrile monomer unit within the above range, a film-shaped molded article such as a dip-molded article formed by the obtained latex composition has a better texture and longer elongation while also having sufficient tensile strength.

Examples of other ethylenically unsaturated monomer that are copolymerizable with the conjugated diene monomer, the ethylenically unsaturated carboxylic acid monomer, and the ethylenically unsaturated nitrile monomer include vinyl aromatic monomer such as styrene, alkylstyrene, and vinylnaphthalene; fluoroalkyl vinyl ethers such as fluoroethyl vinyl ether; ethylenically unsaturated amide monomer such as (meth)acrylamide, N-methylol (meth)acrylamide, N,N-dimethylol (meth) acrylamide, N-methoxymethyl (meth) acrylamide, and N-propoxymethyl (meth)acrylamide; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl dibutyl maleate, dibutyl fumarate, diethyl maleate, methoxymethyl (meth) acrylate, ethoxyethyl (meth)acrylate, methoxyethoxyethyl (meth)acrylate, cyanomethyl (meth)acrylate, 2-cyanoethyl (meth)acrylate, l-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth) acrylate; cross-linkable monomer such as divinylbenzene, polyethylene glycol di(meth)acrylate, polypropylene glycol di(meth) acrylate, trimethylolpropane tri (meth) acrylate, and pentaerythritol (meth)acrylate. These ethylenically unsaturated monomer can be used singly or in combinations.

The content of the other monomer unit formed by the other ethylenically unsaturated monomer in the carboxyl group-containing nitrile rubber (a1) is preferably 10% by weight or less, more preferably 5% by weight or less, and even more preferably 3% by weight or less.

The latex of the carboxyl group-containing nitrile rubber (a1) can be obtained by copolymerizing a monomer mixture containing the above-mentioned monomers, and a method of copolymerizing by emulsion polymerization is preferred. A conventionally known method can be employed as the emulsion polymerization method.

During the emulsion polymerization of the monomer mixture containing the above-mentioned monomers, generally-used polymerization auxiliary materials, such as an emulsifier, a polymerization initiator, a molecular weight regulator can be used. The method for adding these polymerization auxiliary materials is not particularly limited, and any method may be used, such as an initially adding in one batch, adding in several stages, or continuously adding the polymerization auxiliary materials.

Examples of the emulsifier include, but are not particularly limited to, nonionic emulsifiers such as polyoxyethylene alkyl ether, polyoxyethylene alkylphenol ether, polyoxyethylene alkyl ester, and polyoxyethylene sorbitan alkyl ester; anionic emulsifiers such as alkylbenzenesulfonic acid salts like potassium dodecylbenzenesulfonate and sodium dodecylbezene sulfonate, higher alcohol sulfuric acid ester salts, and alkylsulfosuccinic acid salts; cationic emulsifiers such as alkyltrimethylammonium chloride, dialkylammonium chloride, and benzylammonium chloride; and copolymerizable emulsifying agents such as a sulfoester of an α,β-unsaturated carboxylic acid, a sulfate ester of an α,β-unsaturated carboxylic acid, and sulfoalkylaryl ether. Among these, anionic emulsifiers are preferable, alkylbenzenesulfonate is more preferable, and potassium dodecylbenzenesulfonate and sodium dodecylbenzenesulfonate are particularly preferable. These emulsifiers can be used singly or in combinations. The amount of emulsifier to be used is preferably 0.1 to 10 parts by weight based on 100 parts by weight of the monomer mixture.

Examples of the polymerization initiator include, but are not particularly limited to, inorganic peroxides such as sodium persulfate, potassium persulfate, ammonium persulfate, potassium perphosphates, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; and azo compounds such as azobisisobutyronitrile, azobis-2,4-dimethylvaleronitrile, and methyl azobisisobutyrate. Each of these polymerization initiators can be used singly or in combinations. The amount of the polymerization initiator to be used is preferably 0.01 to 10 parts by weight, and more preferably 0.01 to 2 parts by weight, based on 100 parts by weight of the monomer mixture.

In addition, a peroxide initiator can be used as a redox type polymerization initiator in combination with a reducing agent. Examples of the reducing agent include, but are not particularly limited to, a compound containing a metal ion in a reduced state such as ferrous sulfate or cuprous naphthenate; a sulfonic acid compound such as sodium methanesulfonate; and an amine compound such as dimethylaniline. These reducing agents can be used singly or in combinations. The amount of the reducing agent to be used is preferably 3 to 1000 parts by weight based on 100 parts by weight of the peroxide.

The amount of water used during emulsion polymerization is preferably 80 to 600 parts by weight, and particularly preferably 100 to 200 parts by weight, based on 100 parts by weight of the total monomers used.

As the method for adding the monomers, any of a method in which the monomers to be used are added to the reaction vessel in one go, a method in which the monomer is continuously or intermittently added as polymerization proceeds, a method in which a part of the monomers are added and reacted until a specific conversion ratio is reached, and then the remaining monomers are continuously or intermittently added and polymerized, and the like may be employed. In the case of mixing the monomers and adding continuously or intermittently, the composition of the mixture may be constant or may be changed. In addition, each monomer nay be added to the reaction vessel after mixing the various monomers to be used in advance, or may be separately added to the reaction vessel.

Further, polymerization auxiliary materials, such as a chelating agent, a dispersing agent, a pH adjusting agent, a deoxidizing agent, and a particle size adjusting agent, can be optionally used. The type and amount to be used of such polymerization auxiliary materials are not particularly limited.

The polymerization temperature in carrying out the emulsion polymerization is not particularly limited, but it is usually 3 to 95° C., and preferably 5 to 60° C. The polymerization time is about 5 to 40 hours.

As described above, the monomer mixture is subjected to emulsion polymerization, and when a predetermined polymerization conversion ratio is reached, the polymerization reaction is terminated by cooling the polymerization system or adding a polymerization terminator. The polymerization conversion ratio when the polymerization reaction is terminated is preferably 90% by weight or more, and more preferably 93% by weight or more.

Examples of the polymerization terminator include, but are not particularly limited to, hydroxylamine, hydroxylamine sulfate, diethylhydroxylamine, hydroxyamine sulfonic acid and alkali metal salts thereof, sodium dimethyldithiocarbamate, hydroquinone derivatives, catechol derivatives, and aromatic hydroxydithiocarboxylic acids, such as hydroxydimethylbenzenethiocarboxylic acid, hydroxydiethylbenzenedithiocarboxylic acid, and hydrxydibutylbenzenedithiocarboxylic acid, and alkali metal salts thereof. The amount of the polymerization terminator to be used is preferably 0.05 to 2 parts by weight based on 100 parts by weight of the monomer mixture.

After the polymerization reaction has been terminated, the later of the carboxyl group-containing nitrile rubber (a1) can be obtained by removing unreacted monomers to adjust the solid content concentration and the pH, if desired.

Further, an anti-aging agent, a preservative, an antibacterial agent, a dispersing agent, and the like may optionally be appropriately added to the latex of the carboxyl group-containing nitrile rubber (a1).

The number average particle diameter of the latex of the carboxyl group-containing nitrile rubber (a1) is preferably 60 to 300 nm, and more preferably 80 to 150 nm. The particle size can be adjusted to a desired value by a method such as adjusting the amount of the emulsifier and the polymerization initiator to be used.

The latex of the carboxyl group-containing styrene-butadiene rubber (a2) is a latex of a copolymer obtained by copolymerizing styrene in addition to 1,3-butadiene as the conjugated diene monomer and an ethylenically unsaturated carboxylic acid monomer. In addition to these, this latex may be a latex of a copolymer obtained by copolymerizing with another ethylenically unsaturated monomer optionally used and copolymerizable therewith.

The content of the butadiene unit formed by 1,3-butadiene in the carboxyl group-containing styrene-butadiene rubber (a2) is preferably 56 to 78% by weight, more preferably 56 to 73% by weight, and even more preferably 56 to 68% by weight. By setting the content of the butadiene unit within the above range, a film-shaped molded article such as a dip-molded article formed by the obtained latex composition has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomer that can be used include the same examples as mentioned above for the latex of the carboxyl group-containing nitrile rubber (a1). The content of the ethylenically unsaturated carboxylic acid monomer unit formed by the ethylenically unsaturated carboxylic acid monomer in the carboxyl group-containing styrene-butadiene rubber (a2) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the ethylenically unsaturated carboxylic acid monomer unit within the above range, a film-shaped molded article such as a dip-molded article formed by the obtained latex composition has a better texture and longer elongation while also having sufficient tensile strength.

The content of the styrene unit formed by styrene in the carboxyl group-containing styrene-butadiene rubber (a2) is preferably 20 to 40% by weight, more preferably 25 to 40% by weight, and even more preferably 30 to 40% by weight. By setting the content of the styrene unit within the above range, a film-shaped molded article such as a dip-molded article formed by the obtained latex composition has a better texture and longer elongation while also having sufficient tensile strength.

Examples of other ethylenically unsaturated monomers copolymerizable with 1,3-butadiene as the conjugated diene monomer, the ethylenically unsaturated carboxylic acid monomer, and styrene include, in addition to the ethylenically unsaturated monomers (except styrene) mentioned above for the latex of the carboxyl group-containing nitrile rubber (a1), conjugated diene monomer other than 1,3-butadiene of 2,3-dimethyl-1,3-butadiene, 2-ethyl-1,3-butadiene, 1,3-pentadiene, and chloroprene. The content of the other monomer unit formed by the other ethylenically unsaturated monomer in the carboxyl group-containing styrene-butadiene rubber (a2) is preferably 10% by weight or less, more preferably 5% by weight or less, and even more preferably 3% by weight or less. Although isoprene is also conceivable as an example of the conjugated diene monomer, monomer units derived from isoprene may cause softening and degradation upon subjected to irradiation with radiation. Therefore, when performing irradiation with radiation, a rubber that is substantially free from an isoprene-derived monomer unit is preferably used as the carboxyl group-containing styrene-butadiene rubber (a2).

The latex of the carboxyl group-containing styrene-butadiene rubber (a2) used in the present invention can be obtained by copolymerizing a monomer mixture containing the above-mentioned monomer, but a method of copolymerizing by emulsion polymerization is preferable. The emulsion polymerization method may be carried out in the same manner and by employing the same polymerization auxiliary materials as for the carboxyl group-containing nitrile rubber (a1).

Further, an anti-aging agent, a preservative, an antibacterial agent, a dispersing agent, and the like may optionally be appropriately added to the latex of the carboxyl group-containing styrene-butadiene rubber (a2) used in the present invention.

The number average particle diameter of the latex of the carboxyl group-containing styrene-butadiene rubber (a2) used in the present invention is preferably 60 to 300 nm, and more preferably 80 to 150 nm. The particle size can be adjusted to a desired value by a method such as adjusting the amount of the emulsifier and the polymerization initiator to be used.

The latex of the carboxyl group-containing conjugated diene rubber (a3) is a latex of a copolymer obtained by copolymerizing a conjugated diene monomer and an ethylenically unsaturated carboxylic acid monomer. In addition to these, this latex may be a latex of a copolymer obtained by copolymerizing with another ethylenically unsaturated monomer optionally used and copolymerizable therewith.

The content of the conjugated diene monomer unit formed by the conjugated diene monomer in the carboxyl group-containing conjugated diene rubber (a3) is preferably 80 to 98% by weight, more preferably 90 to 98% by weight, and even more preferably 95 to 97.5% by weight. By setting the content of the conjugated diene monomer unit within the above range, a film-shaped molded article such as a dip-molded article formed by the obtained latex composition has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomers that can be used include the same examples as mentioned above for the latex of the carboxyl group-containing nitrile rubber (a1). The content of the ethylenically unsaturated carboxylic acid monomer unit formed by the ethylenically unsaturated carboxylic acid monomer in the carboxyl group-containing conjugated diene rubber (a3) is preferably 2 to 10% by weight, more preferably 2 to 7.5% by weight, even more preferably 2 to 6.5% by weight, still more preferably 2 to 6% by weight, particularly preferably 2 to 5% by weight, and most preferably 2.5 to 5% by weight. By setting the content of the ethylenically unsaturated carboxylic acid monomer unit within the above range, a film-shaped molded article such as a dip-molded article formed by the obtained latex composition has a better texture and longer elongation while also having sufficient tensile strength.

Examples of the conjugated diene monomer include 1,3-butadiene, 2,3-dimethyl-1,3-butadiene, 2-ethyl-1,3-butadiene, 1,3-pentadiene, chloroprene, and the like. As the conjugated diene monomer, any one of these may be used alone, or two or more of them can be used in combination. Although isoprene is also conceivable as an example of the conjugated diene monomer, monomer units derived from isoprene may cause softening and degradation upon subjected to irradiation with radiation. Therefore, when performing irradiation with radiation, a rubber that is substantially free from an isoprene-derived monomer unit is preferably used as a carboxyl group-containing conjugated diene rubber (a3).

Examples of other ethylenically unsaturated monomer copolymerizable with the conjugated diene monomer and the ethylenically unsaturated carboxylic acid monomer include the ethylenically unsaturated monomer (except styrene) mentioned above for the latex of the carboxyl group-containing nitrile rubber (a1). The content of the other monomer unit formed by the other ethylenically unsaturated monomer in the carboxyl group-containing conjugated diene rubber (a3) is preferably 10% by weight or less, more preferably 5% by weight or less, and even more preferably 3% by weight or less.

The latex of the carboxyl group-containing conjugated diene rubber (a3) used in the present invention can be obtained by copolymerizing a monomer mixture containing the above-mentioned monomers, but a method of copolymerizing by emulsion polymerization is preferred. The emulsion polymerization method may be carried out in the same manner and by employing the same polymerization auxiliary materials as for the carboxyl group-containing nitrile rubber (a1).

Those described above can be used as the latex of the carboxyl group-containing conjugated diene rubber (A) used in the present invention. In the present invention, the SP value (solubility parameter) of the carboxyl group-containing conjugated diene rubber (A) is preferably 6.0 to 12 $(cal/cm^3)^{1/2}$, more preferably 7.0 to 11 $(cal/cm^3)^{1/2}$, and even more preferably 8.0 to 11 $(cal/cm^3)^{1/2}$. The SP value of the carboxyl group-containing conjugated diene rubber (A) is also a value estimated by using a simulation software, ASPEN PLUS in the same manner as the SP value of the plasticizer (B) (described later). By setting the SP value of the carboxyl group-containing conjugated diene rubber (A) within the above range, better mixing of the carboxyl group-containing conjugated diene rubber (A) with the plasticizer (B) (described later) can be achieved. As a result, the elongation and durability of a film-shaped molded article such as a dip-molded article formed by the obtained latex composition can be improved more appropriately.

The latex composition of the present invention contains a plasticizer (B) having a SP value of 15 $(cal/cm^3)^{1/2}$ or less, in addition to the above-mentioned latex of a carboxyl group-containing conjugated diene rubber (A). The SP value of the plasticizer (B) used in the present invention is defined by a value estimated by using a simulation software, ASPEN PLUS (As the estimation method of this value, a method described in Examples (described later) can be used).

The plasticizer (B) has an effect on the film-shaped molded article obtained as a result of forming a film-shaped molded article such as a dip-molded article by using a latex composition of the present invention so that the film-shaped molded article has improved elongation and durability while also having a supple texture.

The plasticizer (B) used in the present invention may have a SP value (solubility parameter) of 15 $(cal/cm^3)^{1/2}$ or less, and preferably has a SP value of 12 $(cal/cm^3)^{1/2}$ or less. When the SP value of the plasticizer (B) is too high, the effect of improving the elongation and durability of a film-shaped molded article such as a dip-molded article formed by the obtained latex composition is insufficient. Specifically, while the SP value of the carboxyl group-containing conjugated diene rubber (A) used in the present invention is about 8.0 to 11 $(cal/cm^3)^{1/2}$, the SP value of the water constituting the latex is usually about 23.4 $(cal/cm^3)^{1/2}$. Therefore, when the SP value of the plasticizer (B) to be used is greater than 15 $(cal/cm^3)^{1/2}$, the SP value of the plasticizer (B) approximates the SP value of water from the SP value of the carboxyl group-containing conjugated diene rubber (A). Therefore, in the latex composition, the plasticizer (B) tends to be dissolved in the water constituting the latex, rather than dissolved in the carboxyl group-containing conjugated diene rubber (A). As a result, the effect resulted from the plasticizer (B) of improving the elongation and durability of a film-shaped molded article such as a dip-molded article formed by the obtained latex composition is insufficient. By contrast to this, according to the present invention, by setting the SP value of the plasticizer (B) within the above range, a film-shaped molded article such as a dip-molded article formed by the obtained latex composition having significantly improved elongation and durability while also having a supple texture can be obtained. The lower limit of the SP value of the plasticizer (B) is not particularly limited, and usually is 3.0 $(cal/cm^3)^{1/2}$ or more.

The content of the plasticizer (B) in the latex composition may be 0.1 to 15 parts by weight, preferably 0.1 to 10 parts by weight, and more preferably 0.1 to 5.0 parts by weight, based on 100 parts by weight of the carboxyl group-containing conjugated diene rubber (A) included in the latex. By setting the content of the plasticizer (B) within the above range, a film-shaped molded article such as a dip-molded article formed by the obtained latex composition having significantly improved elongation and durability while also having a supple texture can be obtained. When the content of the plasticizer (B) is too high, the tensile strength, stress retention and durability of a film-shaped molded article such as a dip-molded article formed by the obtained latex composition are worse.

Specific examples of a plasticizer (B) having a SP value of 15 $(cal/cm^3)^{1/2}$ or less (in the following description, the unit of SP value is in "$(cal/cm^3)^{1/2}$".) include sulfonamide compounds such as ethyl-tosylamide (N-ethyl-toluenesulfonamide) (SP value: 11.9); alkyl cinnamates such as ethylhexyl methoxycinnamate (SP value: 7.70); ester compounds of an adipic acid and an ether bond-containing alcohol such as dibutoxyethyl adipate (SP value: 8.8), di(butoxyethoxyethyl) adipate (SP value: 9.2), di(methoxytetraethyleneglycol) adipate, di(methoxypentaethyleneglycol) adipate, and (methoxytetraethyleneglycol) (methoxypentaethyleneglycol) adipate; ester compounds of an azelaic acid and an ether band-containing alcohol such as dibutoxyethyl azelate, and di(butoxyethoxyethyl) azelate; ester compounds of a sebacic acid and an ether band-containing alcohol such as dibutoxyethyl sebacate, and di(butoxyethoxyethyl) sebacate; ester compounds of a phthalic acid and an ether bond-containing alcohol such as dibutoxyethyl phthalate, and di(butoxyethoxyethyl) phthalate; ester compounds of an isophthalic acid and an ether bond-containing alcohol such as dibutoxyethyl isophthalate, and di(butoxyethoxyethyl) isophthalate; dialkyl adipates such as di-(2-ethylhexyl) adipate (SP value: 8.5), diisodecyl adipate (SP value: 8.3), diisononyl adipate, and dibutyl adipate (SP value: 8.9); dialkyl azelates such as di-(2-ethylhexyl) azelate (SP value: 8.5), diisooctyl azelate, and di-n-hexyl azelate; dialkyl sebacates such as di-n-butyl sebacate (SP value: 8.7), and di-(2-ethylhexyl) sebacate (SP value: 8.4); dialkyl phthalates such as dibutyl phthalate (SP value: 9.4), di-(2-ethylhexyl) phthalate (SP value: 9.0), di-n-octyl phthalate, diisobutyl phthalate, diheptyl phthalate (SP value: 9.0), diisodecyl phthalate (SP value: 8.5), diundecyl phthalate (SP value: 8.5), and diisononyl phthalate (SP value: 8.9); dicycloalkyl phthalates such as dicyclohexyl phthalate; aryl phthalates such as diphenyl phthalate, and butyl benzyl phthalate (SP value: 10.2); dialkyl isophthalates such as di-(2-ethylhexyl) isophthalate, and diisooctyl isophthalate; dialkyl tetrahydrophthalate such as di-(2-ethylhexyl) tetrahydrophthalate, di-n-octyl tetrahydrophthalate, and diisodecyl tetrahydrophthalate; trimellitic acid derivatives such as tri-(2-ethylhexyl) trimellitate (SP value: 8.9), tri-n-octyl trimellitate (SP value: 8.9), triisodecyl trimellitate (SP value: 8.4), triisooctyl trimellitate, tri-n-hexyl trimellitate, triisononyl trimellitate (SP value: 8.8), and triisodecyl trimellitate (SP value: 8.8); epoxy-based plasticizers such as epoxidized soybean oil (SP value: 9.0), and epoxidized linseed oil (SP value: 9.3); phosphate ester-based plasticizers such as tricresyl phosphate (SP value: 9.7); or the like. These can be used singly or in combinations.

Of these, sulfonamide compounds such as ethyl-tosylamide (N-ethyl-toluenesulfonamide) (SP value: 11.9), and alkyl cinnamates such as ethylhexyl methoxycinnamate (SP value: 7.70) are particularly preferable, since sulfonamide compounds and alkyl cinnamates can be well mixed with the carboxyl group-containing conjugated diene rubber (A), and a film-shaped molded article such as a dip-molded article formed by the obtained latex composition having further improved elongation and durability while also having a supple texture can be obtained.

The latex composition of the present invention may further contain a metal compound (C) including a divalent or higher metal, in addition to the above-mentioned carboxyl group-containing conjugated diene rubber (A), and the plasticizer (B) having a SP value of 15 $(cal/cm^3)^{1/2}$ or less.

The metal compound (C) including a divalent or higher metal can form a cross-linked structure through metal ion bonding by reacting with the carboxyl group included in the above-mentioned carboxyl group-containing conjugated diene rubber (A), thereby acting as a cross-linking agent.

Examples of the metal compound (C) including a divalent or higher metal include, but are not particularly limited to, zinc compounds, magnesium compounds, titanium compounds, calcium compounds, lead compounds, iron compounds, tin compounds, chromium compounds, cobalt compounds, zirconium compounds, aluminum compounds, and the like. These metal compounds (C) including a divalent or higher metal can be used singly or in combinations. At ng them, from the perspective that the film-shaped molded article such as a dip-molded article formed by the obtained latex composition can have better stress retention, a metal compound including a trivalent or higher metal is preferable, and an aluminum compound is particularly preferable.

Examples of the aluminum compound include aluminum oxide, aluminum chloride, aluminum hydroxide, aluminum nitrate, aluminum sulfate, aluminum metal, aluminum ammonium sulfate, aluminum bromide, aluminum fluoride, aluminum potassium sulfate, aluminum isopropoxide, sodium aluminate, potassium aluminate, sodium aluminum sulfite, and the like. Of these, sodium aluminate is preferable. These aluminum compounds can be used singly or in combinations.

When a metal c pound including a trivalent or higher metal is used as a metal compound (C) including a divalent or higher metal, a metal compound including a divalent metal may be used in combination therewith. Using a metal compound including a divalent metal in combination therewith enables the tensile strength of the film-shaped molded article such as a dip-molded article formed by the obtained latex composition to be further increased. As the metal compound including a divalent metal in the case of using a metal compound including a trivalent or higher metal and a metal compound including a divalent metal in combination, a zinc compound, a magnesium compound, a calcium compound, and a lead compound are preferable, a zinc compound is more preferable, and zinc oxide is particularly preferable.

The content of the metal compound (C) including a divalent or higher metal in the latex composition is, based an 100 parts by weight of the carboxyl group-containing conjugated diene rubber (A) included in the latex, preferably 0.1 to 5 parts by weight, more preferably 0.5 to 2.5 parts by weight, and even more preferably 0.5 to 2.0 parts by weight. By setting the content of the metal compound (C) including a divalent or higher metal to the above range, when performing cross-linking, the cross-linking can be sufficient while also achieving good stability as a latex composition. In addition, in the case of using a metal compound including a trivalent or higher metal as the metal compound (C) including a divalent or higher metal, the content of the metal compound including a trivalent or higher metal in the latex composition is, from the perspective of the stability and cross-linkability of the latex composition, preferably in the range of 0.1 to 1.5 parts by weight based an 100 parts by weight of the carboxyl group-containing conjugated diene rubber (A) included in the latex, more preferably 0.1 to 1.25 parts by weight, and even more preferably 0.1 to 1.0 part by weight. In addition, when a metal compound including a trivalent or higher metal and a metal compound containing a divalent metal are used in combination as the metal compound (C) including a divalent or higher metal, from the perspective of stability and cross-linkability of the latex composition, the content ratio of the "metal compound including a trivalent or higher metal:metal compound including a divalent metal" is preferably, in terms of weight ratio, in the range of 100:0 to 0:100, and more preferably in the range of 10:90 to 90:10.

The latex composition of the present invention may further contain sulfur and/or a sulfur-containing compound (D) as a crosslinking agent.

Examples of sulfur as a cross-linking agent include elemental sulfur that is substantially composed only of sulfur atoms and is applied as a cross-linking agent for cross-linking various rubbers, and in particular, elemental sulfur that acts on the carbon-carbon double bond moiety of the conjugated diene monomer unit. Specific examples thereof include powdered sulfur, precipitated sulfur, colloidal sulfur, insoluble sulfur, highly dispersible sulfur, and the like. Examples of a sulfur-containing compound as a cross-linking agent include a compound that contains a sulfur atom and that is applied as a cross-linking agent for cross-linking various rubbers, and in particular, a compound that acts on the carbon-carbon double bond moiety of the conjugated diene monomer unit. Specific examples thereof include sulfur monochloride, sulfur dichloride, 4,4'-dithiodimorpholine, alkylphenol disulfide, 6-methylquinoxaline-2,3-dithiocarbonate, caprolactam disulfide, dibutyl zinc dithiocarbamate, phosphorus-containing polysulfide, polymer polysulfide, and the like.

The content of the sulfur and/or a sulfur-containing compound (D) as a cross-linking agent in the latex composition of the present invention is preferably 4 parts by weight or less, more preferably 2.5 parts by weight or less, and even more preferably 1.5 parts by weight or less in terms of the total of the sulfur and the sulfur-containing compound, based on 100 parts by weight of the carboxyl group-containing conjugated diene rubber (A) included in the latex. By setting the content of the sulfur and/or a sulfur-containing compound (D) as a cross-linking agent within the above range, the tensile strength and durability of a film-shaped molded article such as a dip-molded article formed by the obtained latex composition can be improved.

When a metal compound including a trivalent or higher metal is used as the metal compound (C) including a divalent or higher metal in the latex composition, the latex composition preferably further contains at least one kind of alcoholic hydroxyl group-containing compound (E) selected from the group consisting of a saccharide (e1), a sugar alcohol (e2), a hydroxy acid (e3), and a hydroxyl acid salt (e4). By further including such an alcoholic hydroxyl group-containing compound (E), the dispersibility of the metal compound including a trivalent or higher metal in the latex composition can be further increased, and as a result, the latex composition can have good stability. As a result, the stress retention of the film-shaped molded article such as a dip-molded article formed by the latex composition can be increased more appropriately.

The alcoholic hydroxyl group-containing compound (E) used in the present invention is at least one kind selected from the group consisting of the saccharide (e1), the sugar alcohol (e2), the hydroxy acid (e3), and the hydroxy acid salt (e4). Of those, from the perspective of further increasing the action and effect of the present invention, it is preferable to use at least one selected from the group consisting of the sugar alcohol (e2) and the hydroxy acid salt (e4). When two or more kinds of alcoholic hydroxyl group-containing compounds (E) are used in combination, it is preferable to use a combination of at least one selected from the group consisting of the saccharide (e1) and the sugar alcohol (e2) and at least one selected from the group consisting of the hydroxy acid (e3) and the hydroxy acid salt (e4), and more preferable to use a combination of the sugar alcohol (e2) and the hydroxy acid salt (e4).

The saccharide (e1) is not particularly limited as long as it is a monosaccharide or a polysaccharide in which two or more monosaccharides are bound by a glycosidic bond. Examples thereof may include monosaccharides such as erythrose, threose, ribose, lyxose, xylose, arabinose, allose, talose, gulose, altrose, galactose, idose, erythrulose, xylulose, ribulose, psicose, fructose, sorbose, and tagatose; disaccharides such as trehalose, maltose, isomaltose, cellobiose, gentiobiose, melibiose, lactose, sucrose, and palatinose; trisaccharides such as maltotriose, isomaltotriose, panose, cellotriose, manninotriose, solatriose, melezitose, planteose, gentianose, umbelliferose, lactosucrose, and raffinose; homo-oligosaccharides such as maltotetraose and isomaltotetraose; tetrasaccharides such as stachyose, cellotetraose, scorodose, lyquinose, and panose; pentasaccharides such as maltopentaose and isomaltopentaose; hexasaccharides such as maltohexaose and isomaltotetraose; and the like. These may be used singly or in combinations.

The sugar alcohol (e2) nay be a sugar alcohol of a monosaccharide or a polysaccharide. Examples there include, but are not particularly limited to, tritols such as glycerin; tetritols such as erythritol, D-threitol, L-threitol; pentitols such as D-arabinitol, L-arabinitol, xylitol, ribitol, and pentaerythritol; pentaerythritol; hexitols such as sorbitol, D-iditol, galactitol, D-glucitol, and mannitol; heptitols such as volemitol and perseitol; octitols such as D-erythro-D-galacto-octitol; and the like. These may be used singly or in combinations. Among then, a hexitol, which is a sugar alcohol having 6 carbon atoms, is preferable, and sorbitol is more preferable.

The hydroxyl acid (e3) is not particularly limited as long as it is a carboxylic acid having a hydroxy group. Examples thereof may include aliphatic hydroxy acids such as glycolic acid, lactic acid, tartronic acid, glyceric acid, 2-hydroxybutyric acid, 3-hydroxybutyric acid, γ-hydroxy butyric acid, malic acid, 3-methylmalic acid, tartaric acid, citramalic acid, citric acid, isocitric acid, leucinic acid, mevalonic acid, pantoic acid, ricinoleic acid, ricinelaidic acid, cerebronic acid, quinic acid, shikimic acid, and serine; aromatic monohydroxy acids such as salicylic acid, creosote acid (homosalicylic acid, hydroxy(methyl) benzoic acid), vanillic acid, sillic acid, hydroxypropanoic acid, hydroxypentanoic acid, hydroxyhexanoic acid, hydroxyheptanoic acid, hydroxyoctanoic acid, hydroxynonanoic acid, hydroxydecanoic acid, hydroxyundecanoic acid, hydroxydododecanoic acid, hydroxytridecanoic acid, hydroxytetradecanoic acid, hydroxypentadecanoic acid, hydroxyheptadecanoic acid, hydroxyoctadecanoic acid, hydroxynonadecanoic acid, and hydroxyicosanoic acid, monohydroxybenzoic acid derivatives such as ricinoleic acid, dihydroxybenzoic acid derivatives such as pyrocatechuic acid, resorcylic acid, protocatechuic acid, gentisic acid, and orthophosphoric acid, trihydroxybenzoic acid derivatives such as gallic acid, phenylacetic acid derivatives such as mandelic acid, benzilic acid, and atorlactic acid, cinnamic acid/hydrocinnamic acid derivatives such as melilotic acid, phloretic acid, coumaric acid, humic acid, cinnamic acid, ferulic acid, and sinapinic acid; and the like. These may be used singly or in combinations. Among them, an aliphatic hydroxy acid is preferable, an aliphatic α-hydroxyl acid is more preferable, glycolic acid, lactic acid, tartronic acid, glyceric acid, malic acid, tartaric acid and citric acid are even more preferable, and glycolic acid is particularly preferable.

The hydroxyl acid salt (e4) is not particularly limited as long as it is a salt of a hydroxy acid. Examples thereof may include the metal salts of the hydroxy acids exemplified as the hydroxy acid (e3), for example: salts of alkali metals such as sodium and potassium; and salts of alkali earth metals such as calcium and magnesium. One kind of hydroxy acid salt (e4) may be used alone, or two or more kinds may be used in combination. As the hydroxy acid salt (e4), an alkali metal salt of a hydroxyl acid is preferable, and a sodium salt of a hydroxy acid is more preferable. Further, the hydroxy acid constituting the hydroxyl acid salt (e4) is preferably an aliphatic hydroxy acid, more preferably an aliphatic α-hydroxy acid, even more preferably glycolic acid, lactic acid, tartronic acid, glyceric acid, malic acid, tartaric acid, or citric acid, and glycolic acid is particularly preferable. In other words, sodium glycolate is particularly preferable as the hydroxyl acid salt (e4).

The content of the alcoholic hydroxyl group-containing compound (E) relative to the metal compound including a trivalent or higher metal in the latex composition used in the preset invention is, in terms of the weight ratio of the "metal compound including a trivalent or higher metal:alcoholic hydroxyl group-containing compound (E)", preferably set to an amount in the range of 1:0.1 to 1:50, more preferably in the range of 1:0.2 to 1:45, and even more preferably in the range of 1:0.3 to 1:30. By setting the content of the alcoholic hydroxyl group-containing compound (E) within the above range, the stability of the latex composition can be further increased.

The content of the alcoholic hydroxyl group-containing compound (E) may be an amount such that the content of the alcoholic hydroxyl group-containing compound (E) relative to the metal compound including a trivalent or higher metal falls within the above range, but is preferably 0.03 to 15 parts by weight, and more preferably 0.05 to 10 parts by weight, based on 100 parts by weight of the carboxyl group-containing conjugated diene rubber (A) included in the latex.

The latex composition of the present invention can be obtained by, for example, blending the plasticizer (B) having a SP value of 15 $(cal/cm^3)^{1/2}$ or less, the optionally-used metal compound (C) including a divalent or higher metal, the optionally-used sulfur and/or a sulfur-containing compound (D) as a cross-linking agent, and the optionally-used alcoholic hydroxyl group-containing compound (E) with a latex of a carboxyl group-containing conjugated diene rubber (A). The method of blending the plasticizer (B) having a SP value of 15 $(cal/cm^3)^{1/2}$ or less, the optimally-used metal compound (C) including a divalent or higher metal, the optionally-used sulfur and/or a sulfur-containing compound (D) as a cross-linking agent, and the optionally-used alcoholic hydroxyl group-containing compound (E) with a latex of a carboxyl group-containing conjugated diene rubber (A) is not particularly limited, but when blending a metal compound (C) including a divalent or higher metal, from the perspective that the metal compound (C) including a divalent or higher metal can be well dispersed in the resulting latex composition, is preferably carried out by dissolving the metal compound (C) including a divalent or higher metal together with the optionally used alcoholic hydroxyl group-containing compound (E) in water or an alcohol, and then adding as an aqueous solution or an alcohol solution.

The latex composition used in the present invention may optionally include, in addition to the above-mentioned latex of a carboxyl group-containing conjugated diene rubber (A), a plasticizer (B) having a SP value of 15 $(cal/cm^3)^{1/2}$ or less, the optionally-used metal compound (C) including a divalent or higher metal, the optionally-used sulfur and/or a sulfur-containing compound (D) as a cross-linking agent, and the optionally-used alcoholic hydroxyl group-containing compound (E), a filler, a pH adjusting agent, a thickening agent, an anti-aging agent, a dispersing agent, pigment, a filler and the like.

The solid content concentration of the latex composition used in the present invention is preferably 10 to 40% by weight, and more preferably 15 to 35% by weight. Further, the pH of the latex composition used in the present invention is preferably 7.5 to 12.0, more preferably 7.5 to 11.0, even more preferably 7.5 to 9.5.

When the latex composition of the present invention contains sulfur and/or a sulfur-containing compound (D) as a cross-linking agent, the latex composition of the present invention is preferably subjected to aging (pre-cross-linking) before dip-molding, from the perspective of improving the mechanical properties of the obtained film-shaped molded article such as a dip-molded article. Although the duration of the pre-cross-linking is not particularly limited and depends an temperatures for the pre-cross-linking, the duration of the pre-cross-linking is preferably 1 to 14 days, and more preferably 1 to 7 days. The temperature for the pre-cross-linking is preferably 20 to 40° C.

After being subjected to the pre-cross-linking, the latex composition of the present invention is preferably stored at a temperature of preferably 10 to 30° C. before subjected to dip-molding. When the latex composition of the present invention is stored so as to be maintained at a high temperature, the tensile strength of the obtained film-shaped molded article such as a dip-molded article may decrease.

Film-Shaped Molded Article

The film-shaped molded article of the present invention is a film-shaped molded article comprising a latex composition of the present invention. The film thickness of the film-shaped molded article of the present invention is preferably 0.03 to 0.50 mm, more preferably 0.05 to 0.40 am, and particularly preferably 0.08 to 0.30 mm.

Although the film-shaped molded article of the present invention is not particularly limited, the film-shaped molded article of the present invention is suitably a dip-molded article obtained by dip-molding the latex composition of the present invention. Although applications of such a dip-molded article are not particularly limited, such a dip-molded article is particularly suitably a glove. The dip-molding is carried out by immersing a mold (for example, a glove-shaped mold) in the latex composition, depositing the composition on the surface of the mold, then removing the mold from the composition, and then drying the composition deposited on the surface of the mold. Note that the mold may be preheated before being immersed in the latex composition. In addition, a coagulant may be optionally used before immersing the mold in the latex composition or after removing the mold from the latex composition.

Specific examples of the method for using the coagulant include a method in which the mold is immersed in a coagulant solution before immersion in the latex composition to adhere the coagulant to the mold (anode coagulation immersion method), a method in which a mold on which the latex composition has been deposited is immersed in a coagulant solution (Teague coagulation immersion method), and the like. From the perspective of obtaining a dip-molded layer having less thickness unevenness, the anode coagulation immersion method is preferable.

Specific examples of the coagulant include water-soluble multivalent metal salts, such as metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate; and the like. Among these, calcium salts are preferable, and calcium nitrate is more preferable. These water-soluble multivalent metal salt may be used singly or in combinations.

The coagulant can be usually used as a solution of water, alcohol or a mixture thereof, and preferably is used in the form of an aqueous solution. This aqueous solution may further contain a water-soluble organic solvent such as methanol and ethanol, or a nonionic surfactant. The concentration of the coagulant varies depending on the type of the water-soluble multivalent metal salt, but is preferably 5 to 50% by weight, and more preferably 10 to 30% by weight.

After removing the latex composition from the mold, the deposited material formed on the mold is usually heated to dryness. The drying conditions can be appropriately selected.

When the latex ca position contains a cross-linking agent, the obtained dip-molded layer is usually heat-treated to be cross-linked. When a metal compound (C) including a divalent or higher metal is included in the latex composition, the cross-linking carried out at this time proceeds through metal ion bending as a result of the metal compound (C) including a divalent or higher metal reacting with the carboxyl group included in the carboxyl group-containing conjugated diene rubber (A). On the other hand, when the sulfur and/or a sulfur-containing compound (D) as a cross-linking agent is included in the latex composition, the sulfur and/or a sulfur-containing compound (D) as a cross-linking agent acts on the carbon-carbon double bond moiety of the conjugated diene monomer unit of the carboxyl group-containing conjugated diene rubber (A), and as a result of this, the cross-linking proceeds. One of these cross-linking can proceed, or both of these cross-linking can proceed. Further, before carrying out the heat treatment, the dip-molded layer may be immersed in water, preferably warm water of 30 to 70° C., for about 1 to 60 minutes to remove water-soluble impurities (e.g., surplus emulsifier, coagulant, etc.). The operation of removing water-soluble impurities may also be performed after the dip-molded layer is heat treated, but from the perspective of removing the water-soluble impurities more efficiently, it is preferable to perform the removal treatment before the heat treatment.

The cross-linking of the dip-molded layer is usually carried out heat treating at a temperature of 80 to 150M, preferably for 10 to 130 minutes. As the heating method, external heating with infrared rays or heated air or internal heating by high frequency can be employed. Of those methods, external heating with heated air is preferable.

Then, the dip-molded layer is detached from the mold for dip-molding to obtain a dip-molded article as a film-shaped molded article. As the detachment method, it is possible to peel off from the old for molding by hand, or peel off using water pressure or pressure from compressed air. After detachment, heat treatment may be further carried out at a temperature of 60 to 120° C. for 10 to 120 minutes. Note that in addition to the method in which the above-mentioned latex composition of the present invention is subjected to dip-molding, the film-shaped molded article of the present invention can be obtained by any method, as long as the method enables for the above-motioned latex composition of the present invention to be molded into the shape of film (for example, applying method, and the like).

The film-shaped molded article of the present invention including a dip-molded article of the present invention is obtained by using the above-mentioned latex composition of the present invention, and therefore, has high tensile strength, large elongation, a supple texture, and high stress retention, and also has excellent durability, and by way of example, can be particularly suitably used as a glove. When the film-shaped molded article is a glove, in order to prevent the film-shaped molded articles from being closely attached to one another at the contact face to enhance the slip in the event of attachment and detachment, inorganic fine particles such as talc and calcium carbonate or organic fine particles such as starch particles can be applied over a surface of the glove, or alternatively, an elastomeric layer containing fine particles can be formed on a surface of the glove, or alternatively, a surface layer of the glove can be subjected to chlorination.

In addition, the film-shaped molded article of the present invention including a dip-molded article of the present invention can also be used in medical devices such as a nipple for baby bottle, a pipette, a tube, a water pillow, a medical balloon, a sack, a catheter, and a condom; toys such as a balloon, a doll, and a ball; industrial devices such as a bag for pressurized molding and a bag for gas storage; a finger stall, and the like, in addition to the above glove.

Further, in the present invention, the obtained dip-molded article may be irradiated with radiation to obtain a dip-molded article subjected to irradiation with radiation. According to the present invention, a dip-molded article formed by the above-mentioned latex composition (a dip-molded article before irradiation with radiation) can be irradiated with radiation to increase the tensile strength and stress retention further. In particular, when the dip-molded article obtained by dip-molding is used for glove applications, in addition to high tensile strength and large elongation, it is important that such gloves confer a feeling of being used when worn and used to perform a task. Specifically, in addition to texture (stress at 500% elongation), it is desirable that the glove can effectively prevent the occurrence of looseness and bagginess that occurs over time since being worn (i.e., has a high stress retention represented as a percentage of a stress M100 (6) after the elapse of 6 minutes since elongation was stopped with respect to a tensile stress M100 (0) % When the glove is stretched at 100%). By contrast to this, according to the present invention, the obtained dip-molded article can be irradiated with radiation to increase the tensile strength and stress retention further. Furthermore, according to the present invention, as mentioned above, since the latex composition of the present invention contains a plasticizer (B) having a SP value of 15 $(cal/cm^3)^{1/2}$ or less, a dip-molded article obtained by dip-molding such a latex composition exhibits a large improvement in durability. Therefore, a dip-molded article of the present invention (in particular, a dip-molded article subjected to irradiation with radiation) can be particularly suitably used for applications in which the dip-molded article is required not to be broken even in the case where the dip-molded article is continuously used for a long period of time (in particular, a surgical glove).

The reason why the tensile strength and stress retention can be further increased by irradiation with radiation is not entirely clear, but it is thought that irradiating with radiation enables the carbon-carbon double bond moiety of the conjugated diene monomer unit of the carboxyl group-containing conjugated diene rubber (A) included in the latex composition to be cross-linked, which enables a high stress retention due to the formation of such cross-linkages.

Examples of the radiation for irradiation include electromagnetic radiation such as γ-rays and X-rays, particle radiation such as an electron beam and β-rays, and the like. However, from the perspective of a better improvement effect in the tensile strength and stress retention of the obtained glove, γ-rays or electron beam are preferable, and γ-rays are particularly preferable. The absorption dose of radiation, such as γ-rays, for irradiation is preferably in the range of 1 to 500 kGy, more preferably in the range of 5 to 300 kGy, and even more preferably in the range of 10 to 100 kGy. In addition, it is desirable to set the irradiation energy and time when performing γ-ray irradiation to appropriate conditions in consideration of a target absorption dose for the irradiation of radiation such as γ-rays and the resistance of the irradiated object to radiation such as γ-rays. The irradiation energy of radiation such as 7-rays may be in the range of 0.1 to 10 MeV. When cobalt 60 is the radiation source, the irradiated energy is preferably 1.17 MeV and 1.33 MeV, and when cesium 137 is the radiation source, the irradiated energy is desirably 0.66 MeV. The irradiation time of radiation such as γ-rays may be the time necessary for obtaining the target irradiation absorption dose of the radiation such as γ-rays, and is not particularly limited.

Substrate Having an Adhesive Layer Formed Thereon

The substrate having an adhesive layer formed thereon of the present invention is a composite of a substrate and an adhesive layer, the composite including, on the substrate, an adhesive layer formed by the above-mentioned latex composition of the present invention.

The substrate is not particularly limited and a fiber substrate can be used, for example. The type of the fiber constituting the fiber substrate is not particularly limited, and examples of the type of this fiber include polyamide fibers such as a vinylon fiber, a polyester fiber, nylon and aramid (aromatic polyamide), glass fibers, cotton, rayon, and the like. These can be appropriately selected depending on their applications. The shape of the fiber substrate is not particularly limited. Examples of the shape of the fiber substrate include the shapes of staple, filament, cord, rope, woven fabric (such as canvas), and the like, and the shape of the fiber substrate can be appropriately selected depending on applications of the fiber substrate.

In addition, the adhesive layer can be formed by the above-mentioned latex composition of the present invention, and may be used as such without the addition of compounding ingredients, and the like to the above-mentioned latex composition of the present invention, or alternatively, by adding various compounding ingredients to the above-mentioned latex composition of the preset invention to obtain an adhesive composition, the adhesive composition may be used to form an adhesive layer.

Examples of the compounding ingredient to be contained in the adhesive composition include adhesive resins. Although the adhesive resin is not particularly limited, by way of example, resorcin-formaldehyde resins, melamine resins, epoxy resins, and isocyanate resins can be suitably used, and among these, resorcin-formaldehyde resins are preferable. With regard to the resorcin-formaldehyde resins, known resorcin-formaldehyde resins (for example, those disclosed in Japanese Patent Laid-Open No. 55-142635) can be used. The reaction ratio of resorcin and formaldehyde is usually 1:1 to 1:5, and preferably 1:1 to 1:3 in terms of the molar ratio of "resorcin:formaldehyde".

For the purpose of further increasing the adhesion force, the adhesive composition can contain conventionally used 2,6-bis (2,4-dihydroxyphenylmethyl)-4-chlorophenol or similar compounds, isocyanates, blocked isocyanates, ethylene urea, polyepoxides, modified polyvinyl chloride resins, and the like.

Further, the adhesive composition may contain vulcanization auxiliary. By including a vulcanization auxiliary in the adhesive composition, the mechanical strength of the substrate having an adhesive layer formed thereon can be improved. Examples of the vulcanization auxiliary include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bis-maleimide, phenylmaleimide, N,N-m-phenylene dimaleimide; sulfur; and the like.

The content (solid content) of the synthetic rubber in the adhesive composition is preferably 5 to 60% by weight, and more preferably 10 to 30% by weight.

The substrate having an adhesive layer formed thereon of the present invention can be obtained by forming an adhesive layer on a substrate, such as by, for example, a method in which the latex composition of the present invention or an adhesive composition containing this latex composition is applied onto a surface of a substrate, or alternatively, by a method in which a substrate is immersed in the latex composition of the present invention or an adhesive composition captaining this latex composition.

Such a substrate having an adhesive layer formed thereon of the present invention can be used as a substrate-rubber composite, for example, by adhering the substrate having an adhesive layer formed thereon to rubber through an adhesive layer. Although the substrate-rubber composite is not particularly limited, examples of the substrate-rubber composite can include a rubber-made toothed belt containing a core wire using a fiber substrate in the form of cord, a rubber-made toothed belt using a fiber substrate in the form of base fabric such as canvas, and the like.

Although the method for obtaining the substrate-rubber composite is not particularly limited, examples of this method include a method in which the latex composition of the present invention or an adhesive composition containing this latex composition is adhered to a substrate with the aid of an applying method, an immersing process, and the like to obtain a substrate having an adhesive layer formed thereon, and the substrate having an adhesive layer formed thereon is mounted on rubber, followed by placing this substrate having an adhesive layer formed thereon on rubber to be subjected to heating and pressurization. The pressurization can be carried out by using a compression (press) molding machine, a metal roll, an injection molding machine, and the like. The pressurization pressure is preferably 0.5 to 20 MPa, and more preferably 2 to 10 MPa. The heating temperature is preferably 130 to 300° C., and more preferably 150 to 250° C. The time required for heating and pressurization is preferably 1 to 180 minutes and more preferably 5 to 120 minutes. As a result of this method by heating and pressurization, the molding of the rubber, and the adhering of a substrate having an adhesive layer formed thereon to rubber can be simultaneously carried out. It is preferable that a mold for providing the rubber of the target substrate-rubber composite with desired surface shape is formed on the inner surface of the mold of the compressor for use in pressurization, and the surface of the roll in advance.

As one aspect of the substrate-rubber composite, a substrate-rubber-substrate composite can be mentioned. The substrate-rubber-substrate composite can be formed, for example, by combining a substrate (which can be a composite of two or more substrates) with a substrate-rubber composite. Specifically, the substrate-rubber-substrate composite can be obtained by stacking a core wire as a substrate, rubber, and base fabric as a substrate (at this time, the latex composition of the present invention or an adhesive composition containing this latex composition is appropriately adhered onto the core wire and the base fabric to form a substrate having an adhesive layer formed thereon), followed by pressurization with heating.

The substrate-rubber composite obtained by using a substrate having an adhesive layer formed thereon of the present invention has excellent mechanical strength, abrasion resistance and water resistance, and for this reason, can be suitably used as a belt such as a flat belt, a V belt, a V-ribbed belt, a round belt, a square belt, and a toothed belt. The substrate-rubber composite obtained by using the substrate having an adhesive layer formed thereon of the present invention has excellent oil resistance, and can be suitably used as an in-oil belt. Further, the substrate-rubber composite obtained by using the substrate having an adhesive layer formed thereon of the present invention can be suitably used in hoses, tubes, diaphragm, and the like. Examples of the hose include single-layered rubber hoses, multi-layered rubber hoses, reinforced hoses of braided type, reinforced hoses of wrapped type, and the like. Examples of diaphragms include a flat diaphragm, a rolling diaphragm, and the like.

The substrate-rubber composite obtained by using the substrate having an adhesive layer formed thereon of the present invention can be used as an industrial product such as a seal and a rubber roll, in addition to the above applications. Examples of the seal include movable-part seals intended for rotation, oscillation, reciprocation and the like, as well as fixed-part seals. Examples of the movable-part seal include an oil seal, a piston seal, a mechanical seal, boots, dustcovers, diaphragms, accumulators, and the like. Examples of the fixed-part seal include 0-rings, various gaskets, and the like. Examples of the rubber roll include rolls as a component of QA devices such as printing devices and copying devices; rolls for processing fibers such as stretching rolls for spinning and drafting rolls for sinning; rolls for ironmaking such as bridle rolls, snubber rolls and steering rolls; and the like.

EXAMPLES

The present invention is now described based on more detailed examples. However, the present invention is not limited to these examples. In the following, unless stated otherwise, "parts" is on a weight basis. In addition, the tests and evaluations were as follows.

SP Values of the Plasticizer (B) and the Carboxyl Group-Containing Conjugated Diene Rubber (A)

The SP values of the plasticizer (B) and of the carboxyl group-containing conjugated diene rubber (A) were estimated by using an SP value-simulating software, Aspen Plus. With regard to Aspen Plus, a specific method for calculating the SP value is not revealed, but the SP value is calculated from the boiling point, the critical point, the critical pressure, the enthalpy of evaporation, and the liquid molar volume estimated from the molecular structure. In addition, when the SP value of a solvent having a generally known SP value is calculated by Aspen Plus, an obtained calculated value was a value almost approximate to the literature value, as shown in Table 3.

Tensile Strength, Elongation at Break, and Stress at 500% Elongation

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. Next, the obtained specimens were stretched at a stretching rate of 500 mm/min, and the tensile strength at break, the elongation at break, and the stress at 500% elongation were measured. The higher the tensile strength and elongation at break, the more preferable, and the smaller the stress at 500% elongation, the more flexible the texture is, which is preferable.

Stress Retention

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. A tensile stress was applied to both ends of the specimens at a rate of 500 mm/min, and when a 25 mm standard section of the specimen had elongated by a factor of 2 (100%), the elongation was stopped and a tensile stress M100(0) was measured. Further, a tensile stress M100(6) after 6 minutes passed was also measured. The percentage of M100(6) relative to M100(0) (i.e., percentage of M100(6)/M00(0))) was taken as the stress retention. The greater the stress retention, the less susceptible the glove is to slackness (looseness or bagginess) when used, which is preferable.

Wearing Endurance Time

A wearing durability test was carried out as follows: an identical person actually wore each of the rubber gloves as the dip-molded articles obtained in Examples and Comparative Examples, and then, similar tasks (inspection, evaluation, and the like) were carried out for 6 hours. The wearing durability test was carried out three times for one sample, and in this test, the time that have been passed for the tearing of the rubber glove was measured, and the median value obtained by three tests (the median value obtained from the time periods that have been passed for the tearing of the rubber glove) was considered to be the wearing endurance time. The wearing endurance time was evaluated only in terms of hours, and was truncated in terms of minutes (For example, when the wearing endurance time was 2 hours and 35 minutes, the wearing endurance time was considered to be 2 hours). Longer wearing endurance time leads to better durability, and is therefore preferable.

Production Example 1 (Production of Latex of Carboxyl Group-Containing Nitrile Rubber)

A pressure-resistant polymerization reaction vessel equipped with a stirrer was charged with 64 parts of 1.3-butadiene, 34 parts of acrylonitrile, 3 parts of methacrylic acid, 0.25 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. Ten the polymerization conversion ratio reached 70%, the polymerization temperature was raised to 43° C., and the reaction was continued until the polymerization conversion ratio reached 95%. Then, 0.1 parts of dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing nitrile rubber having a solid content of 40% by weight and a pH of 8.0. The obtained carboxyl group-containing nitrile rubber had a composition of 64% by weight of the 1,3-butadiene unit, 34% by weight of the acrylonitrile unit, and 3.0% by weight of the methacrylic acid unit.

Example 1

Preparation of Latex Composition 5.0 parts of ethylhexyl methoxycinnamate as a plasticizer (SP value of 7.70 $(cal/cm^3)^{1/2}$) was added to 250 parts of the latex of the carboxyl group-containing nitrile rubber obtained in Production Example 1 (100 parts in terms of the carboxyl group-containing nitrile rubber). Then, deionized water was added thereto to adjust the solid content concentration to 30% by weight, whereby a latex composition was obtained.

Production of Dip-Molded Article (Glove)

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer formed thereon was heat-treated at a temperature of 125° C. for 25 minutes to cross-link the dip-molded layer. The cross-linked dip-molded layer was then peeled off of the glove mold to obtain a dip-molded article (rubber glove). Then, the obtained dip-molded article (rubber glove) was measured in accordance with the methods described above regarding tensile strength, elongation at break, stress at 500% elongation, stress retention, and wearing endurance time. The results are shown in Table 1.

Example 2

The preparation of a latex composition and the production of a dip-molded article (rubber glove) were carried out in the same manner as Example 1, except that when preparing the latex composition, 5.0 parts of ethyl-tosylamide (N-ethyl-toluenesulfonamide) (SP value of 11.9 $(cal/cm^3)^{1/2}$) as a plasticizer was used instead of 5.0 parts of ethylhexyl methoxycinnamate as a plasticizer. Evaluation was carried out in the same manner as Example 1. The results are shown in Table 1.

Example 3

The preparation of a latex composition and the production of a dip-molded article (rubber glove) were carried out in the same manner as Example 1, except that when preparing the latex composition, a mixed solution obtained by dissolving 0.2 parts of sodium aluminate, 0.3 parts of sorbitol, and 0.3 parts of sodium glycolate in water was further added to 250 parts of the latex of the carboxyl group-containing nitrile rubber (100 parts in terms of the carboxyl group-containing nitrile rubber), and the amount of ethylhexyl methoxycinnamate added as a plasticizer was set to be 1.0 part instead of 5.0 parts. Evaluation was carried out in the same manner as Example 1. The results are shown in Table 1.

Example 4

The preparation of a latex composition and the production of a dip-molded article (rubber glove) were carried out in the same manner as Example 1, except that when preparing the latex composition, a mixed solution obtained by dissolving 0.2 parts of sodium aluminate, 0.3 parts of sorbitol, and 0.3 parts of sodium glycolate in water was further added to 250 parts of the latex of the carboxyl group-containing nitrile rubber (100 parts in terms of the carboxyl group-containing nitrile rubber). Evaluation was carried out in the same manner as Example 1. The results are shown in Table 1.

Example 5

The preparation of a latex composition and the production of a dip-molded article (rubber glove) were carried out in the same manner as Example 1, except that when preparing the latex composition, a mixed solution obtained by dissolving 0.2 parts of sodium aluminate, 0.3 parts of sorbitol, and 0.3 parts of sodium glycolate in water, and 0.2 parts of zinc oxide were further added to 250 parts of the latex of the carboxyl group-containing nitrile rubber (100 parts in terms of the carboxyl group-containing nitrile rubber). Evaluation was carried out in the same manner as Example 1. The results are shown in Table 1.

Example 6

The preparation of a latex composition and the production of a dip-molded article (rubber glove) were carried out in the same manner as Example 1, except that when preparing the latex composition, a mixed solution obtained by dissolving 0.2 parts of sodium aluminate, 0.3 parts of sorbitol, and 0.3 parts of sodium glycolate in water, 1.0 part of sulfur, and 1.0 part of zinc dibutyldithiocarbamate were further added to 250 parts of the latex of the carboxyl group-containing nitrile rubber (100 parts in terms of the carboxyl group-containing nitrile rubber). Evaluation was carried out in the same manner as Example 1. The results are shown in Table 1.

Example 7

The preparation of a latex composition and the production of a dip-molded article (rubber glove) were carried out in the same manner as Example 1 except that when preparing the latex composition, 0.5 parts of zinc oxide, 1.0 part of sulfur, and 1.0 part of zinc dibutyldithiocarbamate were further added to 250 parts of the latex of the carboxyl group-containing nitrile rubber (100 parts in terms of the carboxyl group-containing nitrile rubber). Evaluation was carried out in the same manner as Example 1. The results are shown in Table 1.

Comparative Example 1

The preparation of a latex composition and the production of a dip-molded article (rubber glove) were carried out in the same manner as Example 1, except that when preparing the latex composition, 5.0 parts of glycerol (SP value of 16.5 $(cal/cm^3)^{1/2}$) was used instead of 5.0 parts of ethylhexyl methoxycinnamate as a plasticizer. Evaluation was carried out in the same manner as Example 1. The results are shown in Table 1.

Comparative Example 2

The preparation of a latex composition and the production of a dip-molded article (rubber glove) were carried out in the same manner as Example 1 except that when preparing the latex composition, ethylhexyl methoxycinnamate as a plasticizer was not added. Evaluation was carried out in the same manner as Example 1. The results are shown in Table 1.

Comparative Example 3

The preparation of a latex composition and the production of a dip-molded article (rubber glove) were carried out in the same manner as Example 3, except that when preparing the latex composition, the amount of ethylhexyl methoxycinnamate added as a plasticizer was set to be 20 parts instead of 1.0 part. Evaluation was carried out in the same manner as Example 3. The results are shown in Table 1.

Comparative Example 4

The preparation of a latex composition and the production of a dip-molded article (rubber glove) were carried out in the same manner as Example 5, except that when preparing the latex composition, ethylhexyl methoxycinnamate as a plasticizer was not added. Evaluation was carried out in the same manner as Example 5. The results are shown in Table 1.

Comparative Example 5

The preparation of a latex composition and the production of a dip-molded article (rubber glove) were carried out in the same manner as Example 6, except that when preparing the latex composition, ethylhexyl methoxycinnamate as a plasticizer was not added. Evaluation was carried out in the same manner as Example 6. The results are shown in Table 1.

Comparative Example 6

The preparation of a latex composition and the production of a dip-molded article (rubber glove) were carried out in the same manner as Example 7, except that when preparing the latex composition, ethylhexyl methoxycinnamate as a plasticizer was not added. Evaluation was carried out in the same manner as Example 7. The results are shown in Table 1.

Example 8

Using cobalt 60 as the radiation source, the dip-molded article obtained in the same manner as Example 1 was irradiated with γ-rays until the absorbed dose reached 30 kGy. The irradiation time was 3 hours. In this way, a dip-molded article (rubber glove) after γ-ray irradiation was obtained. Then, the obtained dip-molded article (rubber glove) after γ-ray irradiation was evaluated in the same manner as Example 1. The results are shown in Table 2.

Example 9

The dip-molded article obtained in the same manner as Example 2 was irradiated with γ-rays in the same conditions as Example 8 to produce a dip-molded article (rubber glove) after γ-ray irradiation. Evaluation was carried out in the same manner as Example 8. The results are shown in Table 2.

Example 10

The dip-molded article obtained in the same manner as Example 3 was irradiated with γ-rays in the same conditions as Example 8 to produce a dip-molded article (rubber glove) after γ-ray irradiation. Evaluation was carried out in the same manner as Example 8. The results are shown in Table 2.

Example 11

The dip-molded article obtained in the same manner as Example 4 was irradiated with γ-rays in the same conditions as Example 8 to produce a dip-molded article (rubber glove) after γ-ray irradiation. Evaluation % as carried out in the same manner as Example 8. The results are show in Table 2.

Example 12

The dip-molded article obtained in the same manner as Example 5 was irradiated with γ-rays in the same conditions as Example 8 to produce a dip-molded article (rubber glove) after γ-ray irradiation. Evaluation was carried out in the same manner as Example 8. The results are shown in Table 2.

Example 13

The dip-molded article obtained in the same manner as Example 6 was irradiated with γ-rays in the same conditions as Example 8 to produce a dip-molded article (rubber glove) after γ-ray irradiation. Evaluation was carried out in the same manner as Example 8. The results are shown in Table 2.

Example 14

The dip-molded article obtained in the same manner as Example 7 was irradiated with γ-rays in the same conditions as Example 8 to produce a dip-molded article (rubber glove) after γ-ray irradiation. Evaluation was carried out in the same manner as Example 8. The results are shown in Table 2.

TABLE 1

|  |  | Example 1 | Example 2 | Example 3 | Example 4 | Example 5 | Example 6 | Example 7 | Comparative Example 1 |
|---|---|---|---|---|---|---|---|---|---|
| Composition of Latex Composition |  |  |  |  |  |  |  |  |  |
| Carboxyl group-containing nitrile rubber | (parts) | 100 | 100 | 100 | 100 | 100 | 100 | 100 | 100 |
| Sodium aluminate | (parts) | — | — | 0.2 | 0.2 | 0.2 | 0.2 | — | — |
| Sorbitol | (parts) | — | — | 0.3 | 0.3 | 0.3 | 0.3 | — | — |
| Sodium glycolate | (parts) | — | — | 0.3 | 0.3 | 0.3 | 0.3 | — | — |
| Zinc oxide | (parts) | — | — | — | — | 0.2 | — | 0.5 | — |
| Sulfur | (parts) | — | — | — | — | — | 1.0 | 1.0 | — |
| Zinc dibutyldithiocarbamate | (parts) | — | — | — | — | — | 1.0 | 1.0 | — |
| Ethylhexyl methoxycinnamate (SP value: 7.70 $(cal/cm^3)^{1/2}$) | (parts) | 5.0 | — | 1.0 | 6.0 | 5.0 | 5.0 | 6.0 | — |
| Ethyl tosyl amide (SP value: 11.9 $(cal/cm^3)^{1/2}$) | (parts) | — | 6.0 | — | — | — | — | — | — |
| Glycerol (SP value: 16.5 $(cal/cm^3)^{1/2}$) | (parts) | — | — | — | — | — | — | — | 5.0 |
| With or without of γ-ray irradiation |  | No | No | No | No | No | No | No | No |
| Evaluation of dip-molded article (glove) |  |  |  |  |  |  |  |  |  |
| Tensile strength | (MPa) | 6.5 | 6.6 | 15.7 | 15.5 | 19.4 | 17.3 | 18.5 | 6.7 |
| Elongation at break | (%) | 1100 | 1100 | 900 | 900 | 840 | 860 | 800 | 1000 |
| Stress 500% elongation | (MPa) | 1.2 | 1.2 | 2.3 | 2.1 | 3.6 | 3.0 | 6.6 | 1.4 |
| Stress retention | (%) | 51 | 52 | 62 | 61 | 54 | 60 | 57 | 52 |
| Wearing endurance time | (Hr) | 3 | 3 | 5 | 5 | 5 | 5 | 5 | 1 |

TABLE 1-continued

|  |  | Comparative Example 2 | Comparative Example 3 | Comparative Example 4 | Comparative Example 5 | Comparative Example 6 |
|---|---|---|---|---|---|---|
| Composition of Latex Composition |  |  |  |  |  |  |
| Carboxyl group-containing nitrile rubber | (parts) | 100 | 100 | 100 | 100 | 100 |
| Sodium aluminate | (parts) | — | 0.2 | 0.2 | 0.2 | — |
| Sorbitol | (parts) | — | 0.3 | 0.3 | 0.3 | — |
| Sodium glycolate | (parts) | — | 0.3 | 0.3 | 0.3 | — |
| Zinc oxide | (parts) | — | — | 0.2 | — | 0.5 |
| Sulfur | (parts) | — | — | — | 1.0 | 1.0 |
| Zinc dibutyldithiocarbamate | (parts) | — | — | — | 1.0 | 1.0 |
| Ethylhexyl methoxycinnamate (SP value: 7.70 $(cal/cm^3)^{1/2}$) | (parts) | — | 20 | — | — | — |
| Ethyl tosyl amide (SP value: 11.9 $(cal/cm^3)^{1/2}$) | (parts) | — | — | — | — | — |
| Glycerol (SP value: 16.5 $(cal/cm^3)^{1/2}$) | (parts) | — | — | — | — | — |
| With or without of γ-ray irradiation |  | No | No | No | No | No |
| Evaluation of dip-molded article (glove) |  |  |  |  |  |  |
| Tensile strength | (MPa) | 6.7 | 7.1 | 21.7 | 19.1 | 19.0 |
| Elongation at break: | (%) | 1000 | 1100 | 720 | 710 | 610 |
| Stress 500% elongation | (MPa) | 1.4 | 1.5 | 4.8 | 4.5 | 10.3 |
| Stress retention | (%) | 53 | 52 | 56 | 63 | 58 |
| Wearing endurance time | (Hr) | 1 | 1 | 4 | 4 | 4 |

TABLE 2

|  |  | Example 8 | Example 9 | Example 10 | Example 11 | Example 12 | Example 13 | Example 14 |
|---|---|---|---|---|---|---|---|---|
| Composition of Latex Composition |  |  |  |  |  |  |  |  |
| Carboxyl group-containing nitrile rubber | (parts) | 100 | 100 | 100 | 100 | 100 | 100 | 100 |
| Sodium aluminate | (parts) | — | — | 0.2 | 0.2 | 0.2 | 0.2 | — |
| Sorbitol | (parts) | — | — | 0.3 | 0.3 | 0.3 | 0.3 | — |
| Sodium glycolate | (parts) | — | — | 0.3 | 0.3 | 0.3 | 0.3 | — |
| Zinc oxide | (parts) | — | — | — | — | 0.2 | — | 0.5 |
| Sulfur | (parts) | — | — | — | — | — | 1.0 | 1.0 |
| Zinc dibutyldithiocarbamate | (parts) | — | — | — | — | — | 1.0 | 1.0 |
| Ethylhexyl methoxycinnamate (SP value: 7.70 $(cal/cm^3)^{1/2}$) | (parts) | 5.0 | — | 1.0 | 5.0 | 5.0 | 5.0 | 5.0 |
| Ethyl tosyl amide (SP value: 11.9 $(cal/cm^3)^{1/2}$) | (parts) | — | 5.0 | — | — | — | — | — |
| Glycerol (SP value: 16.5 $(cal/cm^3)^{1/2}$) | (parts) | — | — | — | — | — | — | — |
| With or without of γ-ray irradiation |  | Yes | Yes | Yes | Yes | Yes | Yes | Yes |
| Evaluation of dip-molded article (glove) |  |  |  |  |  |  |  |  |
| Tensile strength | (MPa) | 11.2 | 11.1 | 21.8 | 21.1 | 25.3 | 23.5 | 21.1 |
| Elongation at break | (%) | 920 | 930 | 820 | 850 | 810 | 800 | 790 |
| Stress at 500% elongation | (MPa) | 1.5 | 1.4 | 2.7 | 2.6 | 4.1 | 3.6 | 7.2 |
| Stress retention | (%) | 60 | 60 | 68 | 67 | 60 | 63 | 61 |
| Wearing endurance time | (Hr) | 6< | 6< | 6< | 6< | 6< | 6< | 6< |

TABLE 3

| Solvent |  | Calculated | Literature |
|---|---|---|---|
| n-hexane | $(cal/cm^3)^{1/2}$ | 7.26 | 7.24 |
| Toluenen | $(cal/cm^3)^{1/2}$ | 8.89 | 8.91 |
| Methyl ethyl ketone | $(cal/cm^3)^{1/2}$ | 9.20 | 9.27 |
| Acetone | $(cal/cm^3)^{1/2}$ | 9.61 | 9.77 |

Reference: C. M. Hansen: J. Paint Tech., 39[505], 104-117(1967)

As shown in Table 1, it can be confirmed that when a latex composition that contains a predetermined amount of a plasticizer containing a latex of a carboxyl group-containing conjugated diene rubber, and having a SP value of 15 $(cal/cm^3)^{1/2}$ or less is used, the resulting dip-molded article can have largely improved tensile strength and stress retention while well maintaining a large elongation at break and a supple texture (small stress at 500% elongation), and also has long wearing endurance time and excellent durability (Examples 1 to 7).

In particular, with regard to Examples 1, 5 to 7 from a comparison with Comparative Examples 2, 4 to 6, it can be seen that with the addition of ethylhexyl methoxycinnamate as a plasticizer (SP value of 7.70 $(cal/cm^3)^{1/2}$), the stress at 500% elongation, the elongation at break, and the wearing endurance time are significantly improved, and a supple texture and excellent durability can be achieved. Specifically, the plasticizer is highly effective with regard to the texture and durability required for a glove.

In addition, with regard to Examples 1 and 2 from a comparison with Comparative Examples 1 and 2, it can be seen that when ethylhexyl methoxycinnamate (SP value of 7.70 $(cal/cm^3)^{1/2}$) or ethyl tosyl amide (SP value: 11.9 $(cal/cm^2)^{1/2}$) is added, the stress at 500% elongation, the elongation at break, and the wearing endurance time are significantly improved, and a supple texture and excellent durability can be achieved. By contrast to this, when glycerol as a plasticizer having too high SP value (SP value of 16.5 (cal/cm$^3$)$^{1}$a) is added (Comparative Example 1), the evaluation results are similar to that in the case without the addition of a plasticizer (Comparative Example 2), and therefore, it can be seen that when the SP value of the plasticizer is too high, the addition of the plasticizer cannot have any effects.

Further, from a comparison of Examples 3 and 4 with Comparative Example 3, it can be seen that when the amount of ethylhexyl methoxycinnamate added as a plasticizer is too large (Comparative Example 3), the tensile strength, the stress retention, and the wearing endurance time significantly decrease.

In addition, as shown in Table 2, it can be confirmed that by means of a dip-molded article after irradiation with radiation, which is obtained by irradiating a dip-molded article obtained by using a latex composition that contains a predetermined amount of a plasticizer containing a latex of a carboxyl group-containing conjugated diene rubber, and having a SP value of 15 (cal/cm$^3$)$^{1/2}$ or less with radiation, the tensile strength and the stress retention can be further increased by irradiation with radiation, and in addition, longer wearing endurance time and better durability can be achieved (Examples 1 to 7).

The invention claimed is:

1. A latex composition comprising a latex of a carboxyl group-containing conjugated diene rubber (A), a plasticizer (B) having a SP value of 15 (cal/cm$^3$)$^{1/2}$ or less, and a metal compound (C),
    wherein a content of the plasticizer (B) is 0.1 to 15 parts by weight based on 100 parts by weight of the carboxyl group-containing conjugated diene rubber (A) included in the latex,
    a content of the metal compound (C) is 0.1 to 5 parts by weight based on 100 parts by weight of the carboxyl group-containing conjugated diene rubber (A) included in the latex,
    the metal compound (C) includes at least one selected from the group consisting of aluminum oxide, aluminum chloride, aluminum hydroxide, aluminum nitrate, aluminum sulfate, aluminum metal, aluminum ammonium sulfate, aluminum bromide, aluminum fluoride, aluminum potassium sulfate, aluminum isopropoxide, sodium aluminate, potassium aluminate, and sodium aluminum sulfite, and wherein the latex composition does not contain a filler.

2. The latex composition according to claim 1, wherein the carboxyl group-containing conjugated diene rubber (A) is at least one selected from the group consisting of a carboxyl group-containing nitrile rubber (a1) and a carboxyl group-containing styrene-butadiene rubber (a2).

3. The latex composition according to claim 1, further comprising at least one alcoholic hydroxyl group-containing compound (E) selected from the group consisting of a saccharide (e1), a sugar alcohol (e2), a hydroxy acid (e3), and a hydroxy acid salt (e4).

4. The latex composition according to claim 1, further comprising sulfur and/or a sulfur-containing compound (D) as a cross-linking agent in an amount of more than 0 parts by weight and 4 parts by weight or less in terms of the total of the sulfur and the sulfur-containing compound, based on 100 parts by weight of the carboxyl group-containing conjugated diene rubber (A) included in the latex.

5. The latex composition according to claim 1, wherein the plasticizer (B) is at least one selected from the group consisting of a sulfonamide compound and an alkyl cinnamate.

6. A film-shaped molded article, comprising the latex composition according to clam 1.

7. A substrate having an adhesive layer, comprising a substrate and an adhesive layer comprising the latex composition according to claim 1 formed on a surface of the substrate.

8. The latex composition according to claim 1, wherein the content of the metal compound (C) is 0.1 to 2.5 parts by weight based on 100 parts by weight of the carboxyl group-containing conjugated diene rubber (A) included in the latex.

9. The latex composition according to claim 1, wherein the SP value of the plasticizer is from 3 to 7.7 (cal/cm$^3$)$^{1/2}$ or 11.9 to 15 (cal/cm$^3$)$^{1/2}$.

10. The latex composition according to claim 1, further comprising at least one alcoholic hydroxyl group-containing compound (E) selected from the group consisting of a saccharide (e1) selected from the group consisting of a monosaccharide, a disaccharide, trisaccharide, a homo-oligosaccharide, a tetrasaccharide, a pentasaccharide and a hexasaccharide, a sugar alcohol (e2), a hydroxy acid (e3), and a hydroxy acid salt (e4).

11. The latex composition according to claim 1, wherein the latex composition is in a state of an emulsion.

12. The latex composition according to claim 1, wherein the carboxyl group-containing conjugated diene rubber (A) is a carboxyl group-containing nitrile rubber (a1) and a number average particle diameter of the latex of the carboxyl group-containing nitrile rubber (a1) is 60 to 300 nm.

13. The latex composition according to claim 1, wherein a pH of the latex composition is between 7.5 to 12.0.

14. The latex composition according to claim 1, wherein the metal compound (C) further includes a divalent metal.

15. The latex composition according to claim 14, wherein the metal compound (C) including a divalent metal is zinc oxide.

16. A method for producing a dip-molded article, comprising:
    a step of forming a dip-molded layer by dip-molding the latex composition according to claim 1; and
    a step of irradiating the dip-molded layer with radiation.

17. The method for producing a dip-molded article according to claim 16, wherein the radiation used for irradiation in the step of irradiating with radiation is γ-rays.

18. The method for producing a dip-molded article according to claim 16, wherein the dip-molded article is a glove.

* * * * *